United States Patent
McCleary et al.

(10) Patent No.: US 6,684,892 B2
(45) Date of Patent: Feb. 3, 2004

(54) METHOD AND APPARATUS FOR ONLINE AND OFFLINE CLEANING OF INDUSTRIAL SYSTEMS

(76) Inventors: Daniel McCleary, 11014 Sailbrooke Dr., Riverview, FL (US) 33569; Mark Gaffin, 2108 Clifton Dr., Valrico, FL (US) 33594

( * ) Notice: Subject to any disclaimer, the term of this patent is extended or adjusted under 35 U.S.C. 154(b) by 61 days.

(21) Appl. No.: 09/981,974

(22) Filed: Oct. 16, 2001

(65) Prior Publication Data

US 2003/0070694 A1 Apr. 17, 2003

(51) Int. Cl.⁷ .................................................. B08B 9/04
(52) U.S. Cl. ................................. 134/167; 134/169 C
(58) Field of Search ........................... 134/8, 166 C, 134/167 C, 169 C, 167 R, 22.1, 22.12, 22.11, 22.18, 29

(56) References Cited

U.S. PATENT DOCUMENTS

| | | | |
|---|---|---|---|
| 4,391,289 A | | 7/1983 | Adams |
| 4,427,023 A | * | 1/1984 | Greaves ...................... 137/240 |
| 4,585,023 A | * | 4/1986 | Almada ....................... 137/240 |
| 5,035,796 A | | 7/1991 | Saylor et al. |
| 5,069,722 A | | 12/1991 | Murphy |
| 5,190,264 A | * | 3/1993 | Boger ......................... 251/214 |
| 5,465,448 A | | 11/1995 | Tajima et al. |
| 5,803,983 A | * | 9/1998 | Simandl et al. .......... 134/22.12 |
| 5,837,094 A | * | 11/1998 | Tsukazaki et al. ...... 156/345.25 |
| 5,966,767 A | | 10/1999 | Lu et al. |
| 5,987,683 A | | 11/1999 | Leiman et al. |
| 6,021,787 A | * | 2/2000 | Luke ......................... 134/22.1 |
| 6,085,376 A | | 7/2000 | Antal et al. |
| 6,178,173 B1 | | 1/2001 | Mundwiler et al. |
| 6,263,535 B1 | | 7/2001 | Wang |

* cited by examiner

Primary Examiner—Randy Gulakowski
Assistant Examiner—Saeed Chaudhry
(74) Attorney, Agent, or Firm—Bullwinkel Partners, Ltd.

(57) ABSTRACT

An air or liquid handling device access and cleaning method and apparatus which allows the cleaning operator to clean the interior of the air or liquid handling device while the device is operational, thus negating the conventional need to shut down the system. The apparatus contains a flexible cleaning hose which delivers a cleaning agent through a nozzle connected to the distal end of the hose. The hose is subsequently inserting into a hose sealing mechanism which ensures and air-tight seal around the periphery of the hose while still allowing rotational and longitudinal movement of the hose. The preferred embodiment also connects, in seriatim, a pipe "T" junction with a pressure relief valve, a pipe bell reducer, a pipe extension and an access control valve, thus permitting controlled access to the pressurized interior of the air or liquid handling device.

6 Claims, 2 Drawing Sheets

METHOD AND APPARATUS FOR ONLINE AND OFFLINE CLEANING OF INDUSTRIAL SYSTEMS

FIELD OF THE INVENTION

The present invention relates generally to a method and apparatus of cleaning industrial systems while they remain operational. More particularly, the present invention relates to a method and apparatus of cleaning pipes of either negatively or positively pressure-charged industrial systems, such as air flues, air scrubbers, quenchers, forced air fans, liquid containment and handling devices, and the like, while such systems are still in operation and subsequently preventing flow-back of contaminants, cleaning liquids, gases, hazardous materials and the like, during such cleaning and continuous system operation.

BACKGROUND OF THE INVENTION

Many industrial systems that use or produce liquid hazardous materials have a need to insure that these materials are not introduced into the environment. Due to the reactive nature of these systems, debris build up can occur within the transport mechanisms of such materials. The necessity for industrial systems to be cleaned without spillage of hazardous materials is thus paramount. Furthermore, the need for these systems to remain operational at all times can is critical to the dependent manufacturing process. Lastly, the need for these systems to have an effective flow is important to the reactive process and underlying efficiency of the system. Therefore, the option of cleaning these systems online with the ability to prevent exit of debris, or to move the debris into a container without spillage, is very cost effective to industries that deal with hazardous materials.

Furthermore, many industrial systems that produce waste gases wherein a majority of the encapsulated particulates and toxins must be removed before the effluent gas is released into the air. For example, coal burning facilities incorporate air scrubbers in order to remove sulfur dioxide ($SO_2$), particulates, and other contaminants from the effluent air stream before being released into the atmosphere. These cleansing systems, whose main purpose is to reduce pollution and particulate flow into the environment, are often under high internal pressures and temperatures and are very complex and subsequently costly to maintain.

However, inherent with their main task of cleansing effluent air streams, particulate and other pollutant build-ups occur internally within the cleansing systems themselves. This is generally seen as a "caking" or buildup of debris along the interior portions of the air handling system's piping. The more particulate and pollutant buildup within the system, the less efficient the system is at achieving its desired cleansing goals. As such, frequent cleaning of the air handling systems is required.

Since these air handling systems are generally pressurized, entail high temperature gases and have inherently dangerous toxins within the systems, in order to properly sustain these air handling systems and to ensure their efficiency, the systems must frequently be shut down to a non-operative state and thus cleaned or maintained. However, this also means that any connected and dependent systems, such as the manufacturing or industrial processes which are serviced by the air handling units, must also temporarily be shut down while the air handling units are cleaned. This process thus becomes extremely expensive to the facility—not only from the shut-down and cleaning of the air handling system costs, but more attributable to the lost productivity of the dependent industrial systems. This process can further sometimes exceed days.

Many industrial systems utilize forced air throughout. Large forced draft fans are used to produce air flow, or vacuum within these systems. Build up can occur on the fan blades causing the fans to run out of balance. This can severely limit the life of the fan and can affect proper air flow. Regular online cleaning of these fans can extend the life of the fan and help insure even distribution of air throughout the system.

As such, some there have been attempts to expedite the cleaning processes of pipes, piping systems, and draft fans. For example, U.S. Pat. No. 6,263,535, to Wang, issued on Jul. 24, 2001 ('535 patent), discloses an apparatus for cleaning caking adhered on the inner wall of pipes of a waste gas treatment system. The '535 patent teaches the ability of using a retractably movable scrubbing device with metal brush wheels or bristles. The scrubbing device is moved into the pipe via a flexible rod and the rod can be further retractably and automatically received in a chamber by an automatic external winding machine with incorporated guide wheels. The caking on the internal surface of a pipe is subsequently removed by using a rotational movement in conjunction with longitudinal movements of the scrubbing device, thus producing a "scrubbing" effect. The resultant debris is physically removed from the pipes by utilizing optional vacuum attachments. As such, the scrubbing device relies on the friction interaction between the metal brush wheels or bristles and the interior surface of the pipe to be cleaned in order to achieve its cleansing goals. However, limitations of the '535 patent include that it cannot be utilized while the waste gas system is under a pressurized state. As such, the whole system must be shut down prior to commencing the internal cleaning of the piping system, and thus any dependent manufacturing or production systems must also be shut down. Furthermore, with the use of the scrubbing device attached to the end of a flexible rod, the scrubbing device must be repeatedly moved within the pipe to create a "scrubbing" action to ensure adequate cleaning of the interior surface. However, this process is very time consuming and does not ensure adequate cleaning. The present invention overcomes such limitations by, for example, using a sealed connection where a high-pressure fluid hose enters the interior of the system to be cleaned. Such a sealed connection ensures that the cleansing process can occur while the system to be cleaned is still operational and thus does not necessitate system shut-down. This also has the benefit of ensuring that the operator will not be placed in harm of being contaminated with the waste cleaning by-product flow-back or hot and toxic waste gas emissions. Furthermore, the present invention utilizes a high-pressure liquid cleaning mechanism with an enhanced 360° degree cleaning radius. This design further ensures adequate and proper cleaning by not relying on a continuous rotational or longitudinal movement producing a "scrubbing" action within the pipe.

U.S. Pat. No. 5,966,767, to Lu et al., issued on Oct. 19, 1999 ('767 patent), discloses a pipe cleaning device for cleaning the interior surfaces of pipes on a waste gas treatment system. The '767 patent teaches the use of a rigid rod with a hollowed interior. The proximate end of the rod has a handle while the distal end contains a scraper assembly. Furthermore, the '767 patent contains a three-plated sealing mechanism to ensure that the pipe cleaning device creates an air-tight seal around the periphery of the pipe to be cleaned. This enables the cleaning operation to occur while the pipe system is operational and thus does not necessitate system shut-down. The pipe cleaning device operates on a frictional function by rotating the rigid pipe handle, thus rotating the attached scraper assembly. Caking within the pipe is subsequently scraped off. Furthermore, the '767 patent teaches the option of using a pressurized liquid, such as water or other chemicals, which can be injected within the hollow portion of the rigid rod and subsequently ejected from nozzles located near the scraper assembly. This process further enhances the cleaning ability of the '767 patented pipe cleaning device. However, limitations of the '767 patent include a limited reach of the scraper assembly attached to the rigid rod due to the rigid rod's fixed length. The device can only be moved so far down the pipe before its limitation is reached. Furthermore, the '767 patent relies heavily on the rotational movements of the scraper assembly, thus requiring a repetitive process and not ensuring an adequate cleaning operation. Also, the sizing of the scraping assembly must be specifically sized and be at least the same as the interior diameter of the pipe to be cleaned to ensure that the scraper assembly contacts the interior surface of the pipe to be cleaned. Lastly, the '767 patent fails to properly explain how the interaction between the three-plated sealing mechanism and the rigid rod occurs and if the seal subsequently allows for the required rotational and longitudinal movement of the cleaning device while still ensuring a proper and effective seal. The present invention overcomes these limitations by, for example, allowing an enhanced reach of the high-pressure hose by not relying on a rigid rod support system; by using a nozzle jet with high-pressure ejection of a liquid, such as water or a chemical, to ensure adequate cleaning and not requiring a repetitive rotational/longitudinal scraping movement; by not requiring the high-pressuring nozzle to be specifically sized to match the interior diameter of the pipe to be cleaned, such as is required with the '767 patent's scraper assembly, thus allowing a greater number of pipe sizes which may be cleaned; and by using a packing gland compressor assembly to ensure a tight seal around the periphery of the high-pressure hose but also allowing rotational and longitudinal movements of the hose.

U.S. Pat. No. 4,391,289, to Adams, issued on Jul. 5, 1983 ('289 patent), discloses a check valve for a rodding out pipes. The '289 patent is intended to be used with fluid handling systems. The '289 patent teaches the use of a packing gland connected to a check valve when cleaning is initiated. The packing gland allows the insertion of the cleaning rod into the system while maintaining full process pressure and not necessitating system shut-down. However, limitations of the '289 patent include its restriction to be utilized with only fluid-pressurized systems. Furthermore, the '289 patent utilizes a rigid cleaning rod to clean debris and by-product buildup. The present invention overcomes these limitations by, for example, being more adaptable to high-pressure gas systems, such as air scrubbers and quenchers. Furthermore, the present invention utilizes a flexible high-pressure hose with a nozzle jet at the distal end to conduct the cleaning operations, and, as such, is not as limited in application as a rigid rod would be.

U.S. Pat. No. 5,987,683, to Leiman et al., issued on Nov. 23, 1999 ('683 patent), discloses a flexible pipe cleaning device and system. The '693 patent teaches the ability of using a flexible conduit which incorporates the use of either injecting a pressurized fluid or creating a suction within a pipe to be cleaned. As such, the '683 patent does not rely on any mechanical contact between the cleaning device and the pipe interior. However, limitations of the '683 patent include the lack of an adequate sealing member which can be located around the periphery of the pipe to be cleaned to maintain operation of the system while the pipe is cleaned. Furthermore, the '683 patent is intended to be used to clean the interior of conduits, gun barrels, or pipes, including drain pipes. Lastly, the '683 patent has a short fixed length, and thus its reach within the pipe to be cleaned is severely limited. The present invention overcomes these limitations by, for example, using a gland packing component which ensures a seal around the periphery of the pipe, thus allowing the interior of the pipe to be cleaned while the system is still in operation. The present invention is also intended to be used on pressurized systems, such as air scrubbers, quenchers, and the like. Furthermore, the present invention has a greater reach due to the use of a flexible, high pressure hose.

The present invention overcomes the disadvantages and/or shortcomings of known prior art pipe cleaning methods and apparatuses and provides significant improvement thereover.

OBJECTS OF THE PRESENT INVENTION

It is an object of the present invention to provide a method and apparatus to clean air or liquid handling devices while they are still in an operational state, thus negating the need to shut down the entire system.

It is yet another object of the present invention to provide a method and apparatus which efficiently and adequately cleans the interior of pipes.

It is still another object of the present invention to provide a flexible pipe cleaning device which enhances operability and functionality.

It is a further object of the present invention to provide a pipe cleaning apparatus which does not have to be the same size as the interior of the pipe to be cleaned.

SUMMARY OF THE INVENTION

The present invention is a method and apparatus designed to clean the interior of pipes of air handling devices while the air handling device is still in operation, thus negating the conventional need to shut-down the air handling system. Furthermore, the present invention can be utilized to clean hazardous liquid type devices while the device remains operational. The present invention uses a highly pressurized liquid, such as water or chemicals, to inject within the interior of the pipe, thus flushing the surface and removing air handling by-product buildup. The present invention contains a high-pressure hose which enters the piping system through a packing gland compressor which ensures an air-tight seal around the periphery of the hose and yet still allows rotational and longitudinal movements of the hose. Located at the distal end of the hose is a liquid ejection means which cleans the interior of the pipe.

The packing gland compressor is connected to a "T" connection, which has a pressure-relief ball valve on its base end, and is further connected to a pipe bell reducer on the other end. The bell reducer reduces the diameter of the pipe to be cleaned to the operational diameter of the packing gland compressor and high pressure hose. The bell reducer is in turn connected to a pipe extender which houses the high pressure hose liquid ejector when not in operation. Lastly, the pipe extender is attached to a last ball valve acting as the access valve assembly.

The connected components thus operate as a system access device. In summary, the present invention allows access to the interior of an operational air or liquid handling device. As such, the interior of the air or liquid handling device can be cleaned without the need to shut down the system, and subsequently any dependent industrial or manufacturing operations.

BRIEF DESCRIPTION OF THE DRAWINGS

The preferred embodiment is herein described in detail with references to the drawings, where appropriate, wherein.

DETAILED DESCRIPTION OF THE INVENTION

Figure 1:
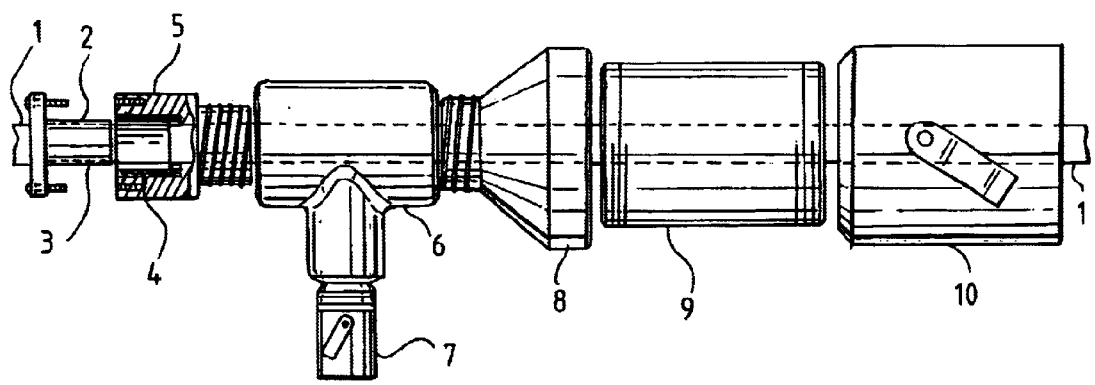
FIG. 1 is a schematic plan view depicting the location and organization of the connected components of the present invention with the high-pressure cleaning hose attached.

Referring to FIG. 1, the preferred embodiment of the present invention is a method and apparatus to access the interior of an air or liquid handling device for cleaning and de-scaling purposes while the device remains operational. Alternately, the present invention can be used to clean the interior of an air or liquid handling device when it is not operational. The present invention provides interior access by being attached to an access location on the handling device which is to be cleaned. Preferably this attachment occurs at a pipe access location.

The preferred embodiment of the present invention utilizes a flexible, high-pressure hose 1 with a liquid ejection nozzle located at its distal end (not shown). The ejection nozzle preferably has the ability to eject liquid at 360 degrees. Alternately, ejection nozzles of varying ejection parameters can be utilized, depending on the cleaning circumstances and desired outcome. As such, when the present invention is inserted into the air or liquid handling device piping system which is to be cleaned, pressurized liquid, preferably water or a viscous chemical, is ejected from the ejection nozzle, thus cleaning the interior surfaces of the piping system. Alternately, the present invention can utilize an abrasive granular blasting material, such as sandblasting media, with an appropriate ejection nozzle to achieve its cleaning purposes.

Figure 3:
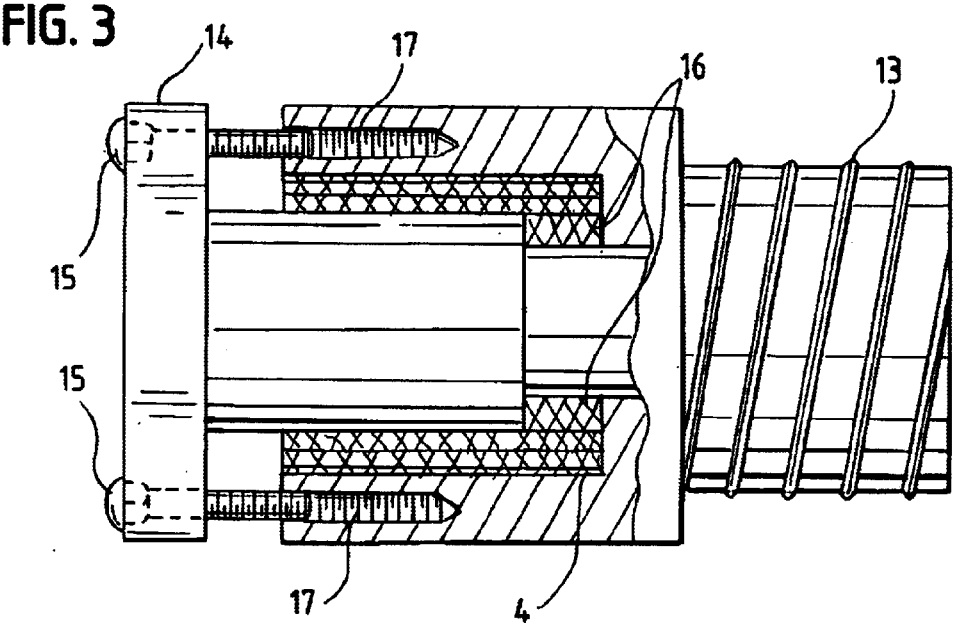
FIG. 3 is a detailed plan view showing the packing gland compressor.

Referring to FIGS. 1 and 3, the high pressure hose 1 is preferably inserted into a hose sealing means which creates an air-tight seal around the periphery of the hose. Preferably, the hose sealing means uses a packing gland compressor 2 which, in turn, is connected to a packing gland chamber 5. Within the interior of the packing gland chamber 5 is a preferably viscous packing material 16, such as a fluoropolymer, liquefied graphite, or the like. Still preferably, the fluoropolymer is polytetrafluoroethylene (PTFE). Alternately, the packing material 16 can be any material with viscosity properties which support an intended purpose of creating an air-tight seal around the periphery of the high pressure hose 1, but still allowing rotational and longitudinal movements of the high pressure hose 1. Still alternately, any device which has the ability to create an air-tight seal around the periphery of the high pressure hose 1 will be adequate.

The packing gland chamber 5 preferably has a plurality of threaded apertures 17 to readily receive the mounting bolts 15. When the packing gland compressor 2 is inserted into the packing gland chamber 5 and the mounting bolts 15 are threaded in a tightening direction, the packing material 16 forms a tight air-seal around the periphery of the high pressure hose 1. Alternately, the packing gland compressor 2 can be threaded on its receiving end, wherein the packing gland chamber 5 would have the same thread count and diameter on its interior and thus readily receive the packing gland compressor 2. As such, when the packing gland compressor 2 is inserted into the packing gland chamber 5 and threaded in a tightening direction, the packing material 16 is compressed against the periphery of the high pressure hose 1. Still alternately, any other type of action which would fixedly press the packing gland compressor 2 into the packing gland chamber 5 and thereby compress the packing material 16 and create an air-tight seal around the periphery of the high-pressure hose 1 would be suitable. As such, the foregoing description should not be viewed a limitation, but rather as an exemplification of the preferred embodiment of the present invention and description of the hose sealing means. The packing gland chamber further preferably has conventional pipe threads 13 on its insertion end with a matching thread count and spacing as the receiving end of the "T" junction 6.

Figure 4:
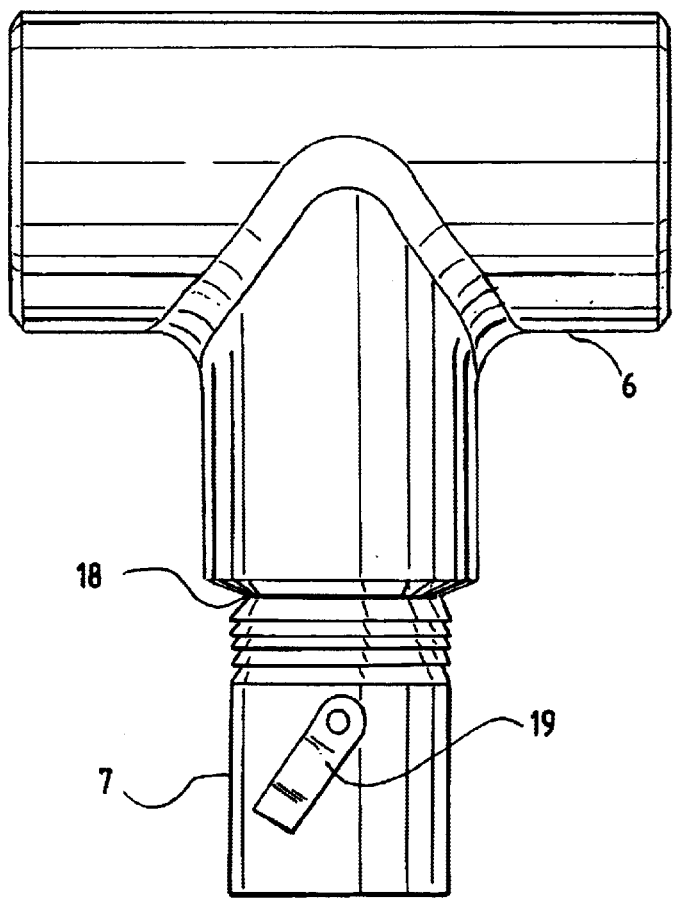
FIG. 4 is a detailed plan view showing the "T" junction with the pressure relief valve attached.

Referring to FIGS. 1 and 4, the packing gland chamber 5 is preferably connected to a conventional "T" pipe junction 6 with a pressure relief means located on the bottom end of the "T" pipe junction 6. Preferably, the pressure relief is a pressure relief valve 7. Still preferably, the pressure release valve 7 is connected with a conventional thread mechanism 18 or a chamlock connection. Alternately, any type of pipe connection technique or pressure relief means will be appropriate. The pressure release valve 7 is preferably a ball valve 19, but can alternately be any type of conventional pipe valve. The pressure release valve 7 ensures that the internal pressure within the system access device is controllable and does not exceed design parameters, thus creating a hazardous condition. Alternately, the pressure release valve 7 can be connected to a suction system, such as a vacuum device, which will vacuum any debris which accumulates during the cleaning operation.

The internal diameters of the packing gland compressor 2, the packing gland chamber 5 and the "T" pipe junction 6 is variable, but is preferably slightly greater than the outside diameter of the high pressure hose 1. This will ensure an air-tight and efficient seal around the periphery of the high pressure hose 1 by the packing material 4.

The opposite end of the "T" pipe junction 6 is preferably attached to a pipe bell reducer 8. The pipe bell reducer 8 is sized to match the diameter of the "T" pipe junction 6 at its reduced end and is matched to the diameter of the internal pipe access location (not shown). Alternately, the packing gland chamber 5 can be connected directly to the preferred pipe bell reducer 8. The pipe bell reducer 8 is thus interchangeable to conform to varying diameters of pipe access locations.

Figure 2:
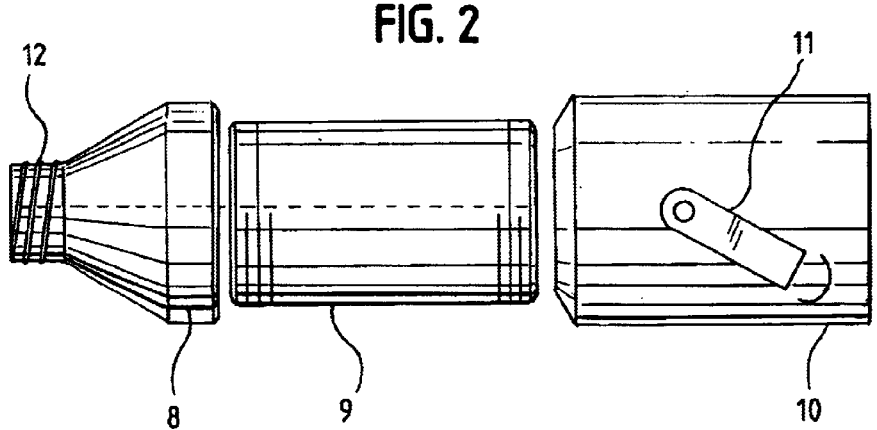
FIG. 2 is a detailed plan view showing the bell reducer, the pipe extension and the access valve.

Referring to FIGS. 1 and 2, the bell reducer 8 is preferably further connected to a pipe extension 9. The pipe extension 9 is intended to accommodate the distal end of the high pressure hose 1 liquid ejection nozzle while the present invention is in a withdrawn state. The pipe extension 9 is preferably at least 24 inches in length to accommodate a majority of different liquid ejection nozzles. However, any length of the pipe extension 9 will be adequate.

The preferred embodiment further entails an access control valve 10 which is connected to the preferred pipe extension 9. The access control valve 10 is preferably a ball valve 11. However, alternately, any type of valve will be adequate. Further alternately, the bell reducer 8 can be connected directly to the access control valve 10. The access control valve 10 allows controllable access to the interior of the air or liquid handling piping system. Preferably, the access control valve 10 is connected directly to the air or liquid handling piping system. As such, upon opening the access control valve 10, access to the interior of the air or liquid handling piping system is achieved.

The components, as described above, are preferably connected in seriatim with conventional threaded pipe connections, thus allowing easy and manageable operation in the field. Alternately, any type of piping connection method will work and subsequently does not affect or alter the operability of the present invention. The components are further preferably constructed of a non-corrosive material, such as stainless-steel, but can alternately be constructed of any metal, plastic, fiberglass, or other corrosion resistant material.

Furthermore, the above description describes the preferred and alternate embodiments of the present invention, including the preferred placement order of the components connected in seriatim. However, it is to be understood that the described components can be connected and placed in any order without effecting or altering the true spirit and scope of the present invention. For example, the pipe bell reducer 8 can be connected and placed between the packing gland chamber 6 and the "T" pipe junction 6. Or the packing gland compressor 2 and packing gland chamber 5 can be placed between the bell reducer 8 and the pipe extension 9. Further alternately, components that are not required for a specific cleaning operation can be left out without effecting the operation of the present invention. For example, if the interior pipe diameter does not need to be reduced, the bell reducer 8 would not be necessary and thus does not need to be incorporated. At a minimum, however, the present invention must have a hose sealing means connected to the access control valve 10 via a connecting means with the high pressure hose 1 inserted therein.

Referring to FIGS. 1–4, the preferred process of using the preferred embodiment of the present invention to clean an operational air or liquid handling device, such as an air scrubber, quencher, forced air fan, or the like, occurs with the following steps. Alternately, the air or liquid handling device can be shut down. Preferably using threaded connections and conventional pipe wrenches, the access control valve 10 is threaded onto the pipe access location of the air or liquid handling device. The pipe extension 9, followed by the bell reducer 8, "T" pipe junction 7 and pressure relief valve 7, and packing gland chamber 5 are connected in seriatim and tightened with the pipe wrench. The flexible high pressure hose 1, with the liquid ejection nozzle connected at its distal end, is inserted into the connected components via the packing gland compressor 2 and packing gland chamber 5. The mounting bolts 15 are tightened, thus forcing the packing gland compressor 2 into the interior of the packing gland chamber 5, which subsequently compresses the packing material 16 against the periphery of the high pressure hose 1 to create an air-tight seal. While the pressure relief valve 7 is in a closed position and the air or liquid handling unit's internal pipe access valve is open, the access control valve 10 is opened. The high pressure hose 1 is subsequently pressurized, thus ejecting liquid from its ejection nozzle. The cleaning of the pipes of the air or liquid handling unit occurs by slowly rotating the high pressure hose 1 as it is feed into the air or liquid handling unit. An alternate embodiment of the present invention is to attach a vacuum means to the pressure relief valve 7 during the cleaning operation. As such, debris attributable to the cleaning operation will immediately be removed from the air or liquid handling system via the vacuuming means.

When cleaning has ceased, the high pressure hose 1 ejection process is shut down and is extracted from the air or liquid handing unit until the ejection nozzle is seated in the pipe extension 9. The access control valve 10 is then closed, subsequently once again sealing the air or liquid handling unit. The packing gland compressor 2 can be loosened from the packing gland chamber 5, thus breaking the packing material 4 seal from the periphery of the high pressure hose 1.

While preferred and alternate embodiments have been described herein, it is to be understood that these descriptions are only illustrative and are thus exemplifications of the present invention and shall not be construed as limiting. It is to be expected that others will contemplate differences, which, while different from the foregoing description, do not depart from the true spirit and scope of the present invention herein described and claimed.

We claim:

1. An air or liquid handling device access and cleaning apparatus which accesses the interior of an air or liquid handling device at a pipe access location having a pipe access diameter and a pipe access connection mechanism, said apparatus comprising:

a. a flexible cleaning agent delivery hose capable of delivering a cleaning agent having an outside diameter and said delivery hose having a proximate end and a distal end;

b. a cleaning agent ejection nozzle capable of ejecting said cleaning agent fixedly attached to said distal end of said delivery hose;

c. a hose sealing means having an attachment end and an entrance end, said hose sealing means having an inside diameter larger than said outside diameter of said delivery hose whereby creating an air-tight seal around the periphery of said outside diameter of said delivery hose when said delivery hose is inserted through entrance end of said hose sealing means;

d. an access control valve, said access control valve having an access end and a component end, said access end having the same diameter and connection mechanism as said pipe access diameter and said pipe access connection mechanism, said access end is attached to said pipe access location, said component end is attached to said attachment end of said hose sealing means by a connecting means;

e. pressure relief means including a pressure relief valve fixedly attached to said hose sealing means via said connecting means;

f. said connecting means comprising a pipe "T" junction having a lateral portion and a longitudinal portion, said lateral portion having a lateral entrance end and a lateral attachment end, said longitudinal portion having a termination end, said lateral entrance end being attached to said attachment end of said hose sealing means;

g. said pressure relief being attached to said termination end of said longitudinal portion of said "T" junction; and h. said connecting means further comprising a pipe diameter reducing means.

2. The apparatus as claimed in claim 1 wherein said pipe diameter reducing means is a pipe bell reducer, said pipe bell reducer having a reduced end and an enlarged end, said reduced end is attached to said lateral attachment end of said pipe "T" junction.

3. The apparatus as claimed in claim 2 wherein said connecting means further comprises a pipe extension, said pipe extension having an extension component end and an extension attachment end, said extension component end is attached to said enlarged end of said pipe bell reducer, said extension attachment end is attached to said component end of said access control valve.

4. The apparatus as claimed in claim 1 wherein said access control valve is a ball valve.

5. The apparatus as claimed in claim 1 where in said hose sealing means comprises a packing gland chamber, a packing gland compressor, and packing material, said packing gland compressor having an inserting end, said packing gland chamber having an interior and a receiving end, said packing material is placed around the periphery of said interior of said packing gland chamber, said inserting end of said packing gland compressor is inserted into said receiving end of said packing gland chamber in a tightening manner whereby compressing said packing material; said packing material comprising a viscous substance selected from the group consisting essentially of fluoropolymers.

6. The apparatus as claimed in claim 5 wherein said fluoropolymer is polytetrafluoroethylene.

* * * * *